(12) United States Patent
Testanero et al.

(10) Patent No.: US 9,449,267 B1
(45) Date of Patent: Sep. 20, 2016

(54) METHODS AND SYSTEMS FOR PREVENTING TAMPERING OF A SMART TAG

(71) Applicant: Cellotape, Inc., Fremont, CA (US)

(72) Inventors: Nick Testanero, Torrington, CT (US); Larry Tadashi Ino, Santa Clara, CA (US)

(73) Assignee: CELLOTAPE, INC., Fremont, CA (US)

( * ) Notice: Subject to any disclaimer, the term of this patent is extended or adjusted under 35 U.S.C. 154(b) by 0 days.

(21) Appl. No.: 14/243,746

(22) Filed: Apr. 2, 2014

Related U.S. Application Data

(63) Continuation-in-part of application No. 13/830,108, filed on Mar. 14, 2013, which is a continuation-in-part of application No. 13/673,674, filed on Nov. 9, 2012.

(51) Int. Cl.
*G08B 5/22* (2006.01)
*G06Q 30/00* (2012.01)
*G06K 19/07* (2006.01)
*G06K 19/077* (2006.01)
*G06K 19/073* (2006.01)

(52) U.S. Cl.
CPC ... *G06K 19/07737* (2013.01); *G06K 19/07327* (2013.01)

(58) Field of Classification Search
USPC .............................. 235/492; 340/572.1–572.8
See application file for complete search history.

(56) References Cited

U.S. PATENT DOCUMENTS

| | | | |
|---|---|---|---|
| 8,522,977 B1* | 9/2013 | Britt, Jr. | 206/459.1 |
| 2006/0017573 A1* | 1/2006 | Noguchi | 340/572.8 |
| 2007/0034686 A1 | 2/2007 | Davis et al. | |
| 2012/0061465 A1 | 3/2012 | Luo | |
| 2012/0075072 A1 | 3/2012 | Pappu | |
| 2012/0309307 A1 | 12/2012 | D'Amico | |
| 2013/0140358 A1 | 6/2013 | Graef et al. | |
| 2013/0206841 A1 | 8/2013 | Cairns | |
| 2013/0225079 A1 | 8/2013 | Ashour et al. | |
| 2014/0113549 A1 | 4/2014 | Beg et al. | |

FOREIGN PATENT DOCUMENTS

EP  2469453  6/2012

OTHER PUBLICATIONS

Non-Final Office Action mailed Sep. 18, 2014, U.S. Appl. No. 13/830,108, filed Mar. 14, 2013, Nick Testanero.
Final Office Action mailed Dec. 9, 2014, U.S. Appl. No. 13/830,108, filed Mar. 14, 2013, Nick Testanero.
Compucorp, Compucorp & Monroe 300-Series Portable Calculators, 1999, http://www.classiccmp.org/calcmuseum/compucorp_portable.htm, 12 pages.

(Continued)

*Primary Examiner* — Daniel Hess
(74) *Attorney, Agent, or Firm* — Haverstock & Owens LLP

(57) ABSTRACT

Embodiments of the present invention relates to methods and systems for preventing tampering of a smart tag, such as a near field communication (NFC) tag or the like, in a retail environment. The smart tag is typically coupled with a protector at one side of the smart tag to prevent programming or encoding of the smart tag. The protector is removed to allow the smart tag to be programmed or write enabled. The smart tag is typically coupled with a sticker for adhering with an object such as a gift item.

9 Claims, 11 Drawing Sheets

(56) References Cited

OTHER PUBLICATIONS

International Search Report and Written Opinion mailed on Jun. 29, 2015 PCT Application No. PCT/US2015/022850, Testanero, Nick et al.

McFerran, How to use NFC tags, Mar. 2012, http://www.cnet/howto/howtousenfctagswithyourandroidmobilephone/.

YouTube, How to program an NFC tag, Feb. 2012, https://www.youtube.com/watch?v=9nGs0R8-suQ.

Office Action dated May 21, 2015. U.S. Appl. No. 13/830,108, filed Mar. 14, 2013, 5 pages.

\* cited by examiner

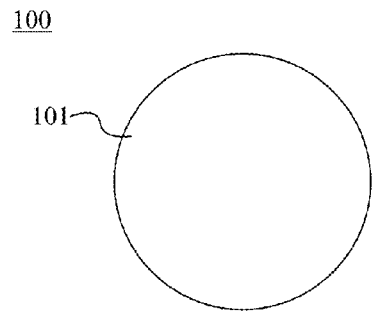
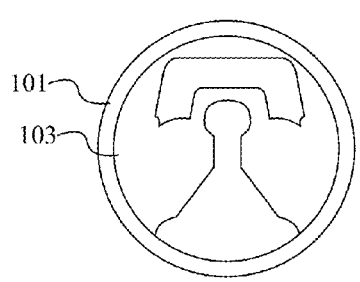
Fig. 1A  Fig. 1B
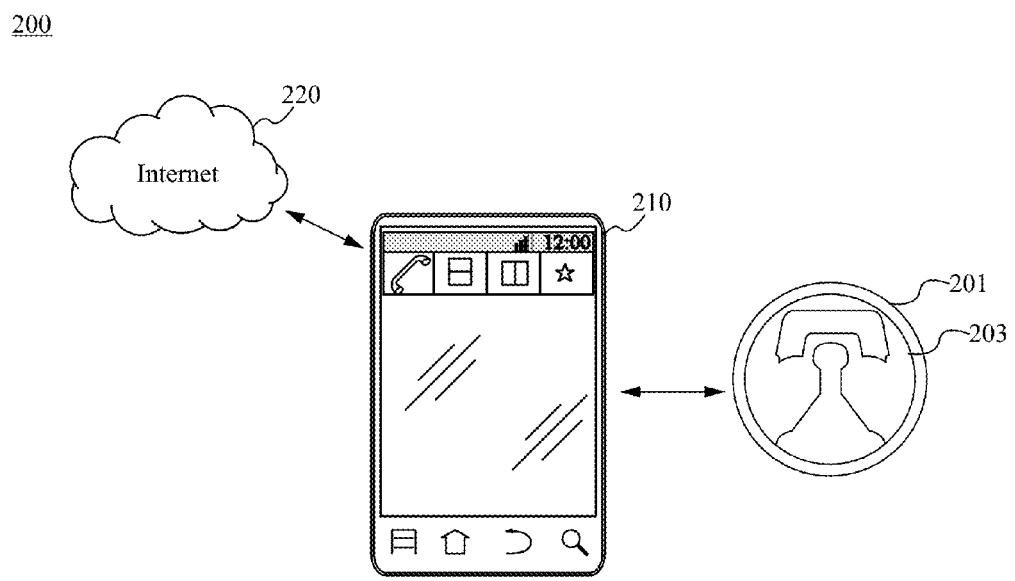
Fig. 2

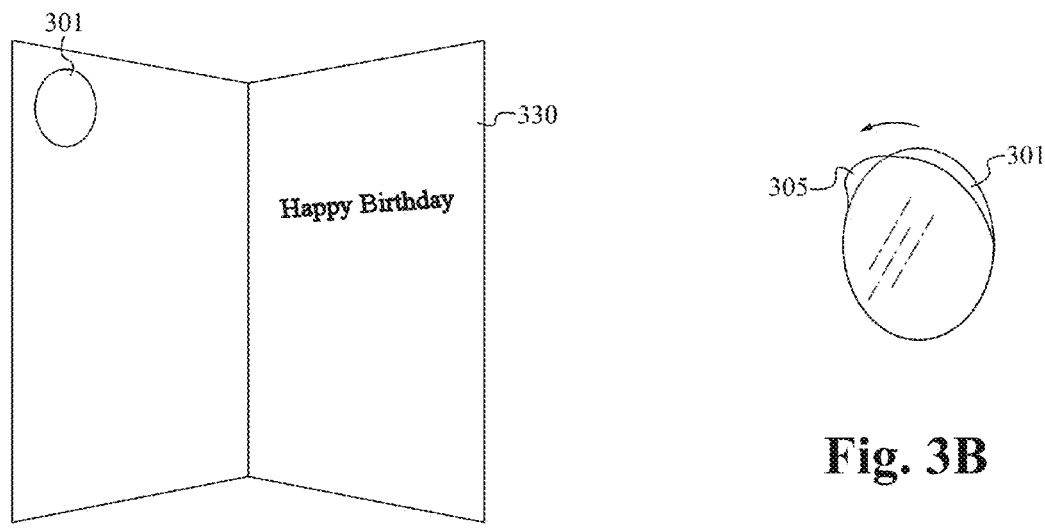
Fig. 3A
Fig. 3B
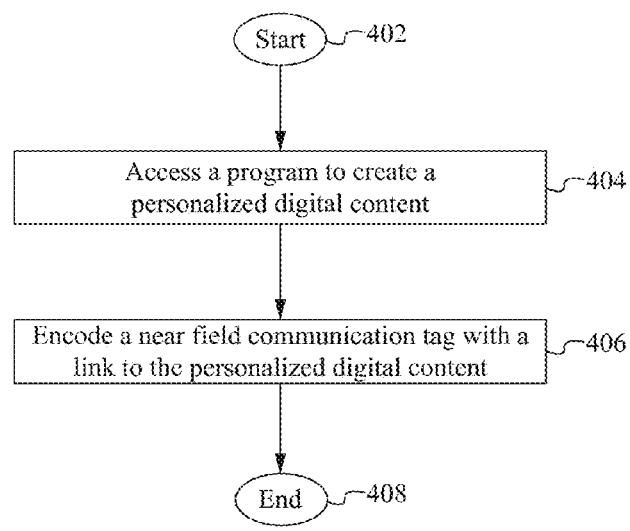
Fig. 4

METHODS AND SYSTEMS FOR PREVENTING TAMPERING OF A SMART TAG

FIELD OF THE INVENTION

This patent application is a continuation in part of the U.S. patent application Ser. No. 13/830,108, filed Mar. 14, 2013, entitled "METHOD, SYSTEM AND APPARATUS FOR AUTOMATICALLY LINKING DIGITAL CONTENT TO A DEVICE," which in turn is a continuation in part of the co-pending U.S. patent application Ser. No. 13/673,674, filed Nov. 9, 2012, entitled "METHOD, SYSTEM AND APPARATUS FOR AUTOMATICALLY LINKING CUSTOMIZABLE AND/OR PERSONALIZED DIGITAL CONTENT TO AN OBJECT," both of which are hereby incorporated by reference.

FIELD OF THE INVENTION

The present invention generally relates to the field of near field communication (NFC) and NFC tags. More specifically, the present invention relates to methods and systems for preventing tampering of a smart tag.

BACKGROUND OF THE INVENTION

Near field communication (NFC) tags contain chips which can store a small amount of information for transfer to an NFC enabled device. A NFC tag can be programmed or encoded with any data by using an NFC enabled device and a NFC encoding software installed thereon. The NFC tag can thereafter be locked so that data written to the NFC tag cannot be altered. Data on the NFC tag can be transferred to any NFC device by tapping the NFC tag.

SUMMARY OF THE INVENTION

Embodiments of the present invention relates to methods and systems for preventing tampering of a smart tag, such as a near field communication (NFC) tag or the like, in a retail environment. The smart tag is typically coupled with a protector at one side of the smart tag to prevent programming or encoding of the smart tag. The protector is removed to allow the smart tag to be programmed or write enabled. The smart tag is typically coupled with a sticker for adhering with an object such as a gift item.

In one aspect, a sticker system includes a sticker tag and a barrier. The sticker tag includes a programmable NFC tag and a sticker coupled with the NFC tag. The barrier is removably coupled with the sticker tag using an adhesive. Typically, when the barrier remains coupled with the sticker tag, the NFC tag cannot be programmed. Typically, when the barrier is removed from the sticker tag, the NFC tag can be programmed.

In some embodiments, the NFC tag is coupled with the sticker on one side of the NFC tag and is removably coupled with the barrier on another side of the NFC tag. The NFC tag is positioned between the sticker and the barrier.

In some embodiments, the sticker is coupled with the NFC tag on one side of the sticker and is removably coupled with the barrier on another side of the sticker via an adhesive. The sticker is positioned between the barrier and the NFC tag.

In some embodiments, the barrier includes a carrier.

In some embodiments, the barrier includes a printed image on a surface of the barrier. For example, the printed image can include instructions to use the sticker system.

In some embodiments, the barrier is a foil sheet. The foil sheet can be silver or any other color.

In some embodiments, a size of the barrier is the same as a size of the sticker. In some embodiments, the size of the barrier is at least a size of the NFC tag.

In some embodiments, the sticker system further includes a carrier. In some embodiments, The barrier is removably coupled with the carrier. In some embodiments, the sticker tag is removably coupled with the carrier.

In some embodiments, the sticker system further includes a gift item configured to receive coupled with the sticker tag. For example, a gift item is a greeting card. For another example, a gift item is a gift basket. Other gift items are contemplated.

In another aspect, a method of forming a sticker system is provided. A barrier, a sticker, and a NFC tag including a first side and a second side are obtained. A sticker tag is prepared. In some embodiments, preparing the sticker tag includes coupling the sticker with the first side of the NFC tag. The barrier is then removably coupled with the second side of the NFC tag.

In some embodiments, when the barrier remains coupled with the NFC tag, the NFC tag is write protected. In addition, when the barrier is removed from the NFC tag, the NFC tag is no longer write protected and the sticker tag is configured to adhere with an object.

In yet another aspect, a method of forming a sticker system is provided. A carrier, a barrier, a sticker including a first surface and a second surface, and a NFC tag are obtained. A sticker tag is prepared. In some embodiments, preparing the sticker tag includes removably coupling the barrier with the first surface of the sticker, and coupling the NFC tag with the second surface of the sticker. The carrier is then removably coupled with the second surface of the sticker.

In some embodiments, when the barrier remains coupled the first surface, the NFC tag is write protected. In addition, when the barrier is removed from the first surface, the NFC tag is no longer write protected. In addition, when the sticker tag is removed from the carrier, the sticker tag is configured to adhere with an object.

BRIEF DESCRIPTION OF THE DRAWINGS

The novel features of the invention are set forth in the appended claims. However, for purpose of explanation, several embodiments of the invention are set forth in the following figures.

FIG. 1A illustrates a first side of an apparatus for automatically linking customizable and/or personalized information to an object in accordance with some embodiments.

FIG. 1B illustrates a second side of an apparatus for automatically linking customizable and/or personalized information to an object in accordance with some embodiments.

FIG. 2 illustrates a system for automatically linking customizable and/or personalized information to an object in accordance with some embodiments.

FIG. 3A illustrates an apparatus for automatically linking customizable and/or personalized information to an object attached to an object in accordance with some embodiments.

FIG. 3B illustrates an apparatus for automatically linking customizable and/or personalized information to an object in accordance with some embodiments.

FIG. 4 illustrates a method of automatically linking customizable and/or personalized information to an object in accordance with some embodiments.

DETAILED DESCRIPTION OF THE INVENTION

Figure 5:
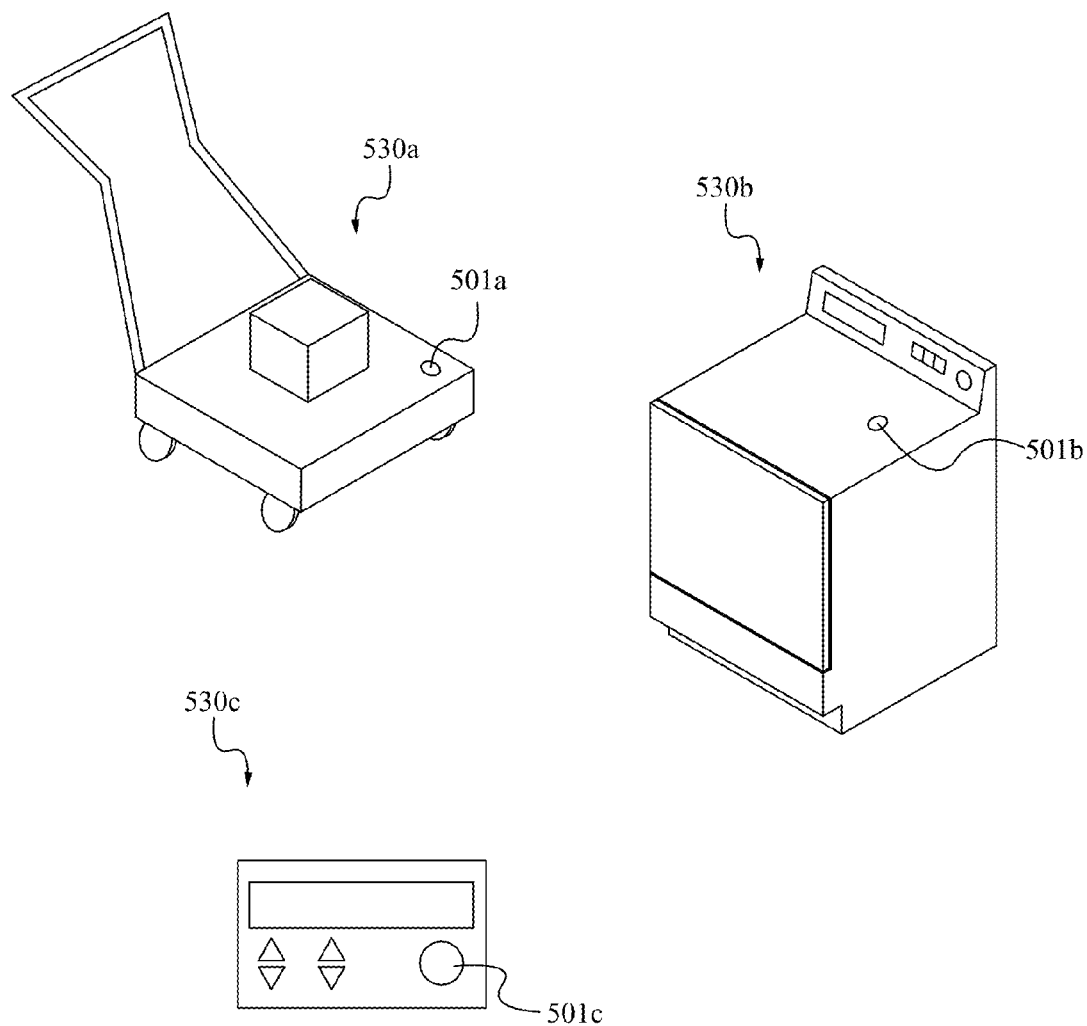
FIG. 5 illustrates exemplary apparatuses for automatically linking digital content to an object attached to an object in accordance with some embodiments.

The description below concerns several embodiments of the presently claimed invention. The discussion references the illustrated preferred embodiment. However, the scope of the presently claimed invention is not limited to either the illustrated embodiment, nor is it limited to those discussed, to the contrary, the scope should be interpreted as broadly as possible based on the language of the Claims section of this document.

This disclosure provides several embodiments of the presently claimed invention. It is contemplated that any features from any embodiment can be combined with any features from any other embodiment. In this fashion, hybrid configurations of the illustrated embodiments are well within the scope of the presently claimed invention.

Referring now to FIGS. 1A and 1B, an apparatus for automatically linking customizable and/or personalized information to an object in is depicted therein. The apparatus 100 comprises a tag body 101 and a near field communication (NFC) tag 103 attached to or embedded within the body 101. In some embodiments, the body 101 further comprises an attachment mechanism for attaching the apparatus 100 to an additional object. For example, in some embodiments, the apparatus 100 further comprises an adhesive layer, hook and loop fastener or other means for attaching the apparatus 100 to the additional object.

In some embodiments, the NFC tag 103 is blank and comprises a serial code unique to the NFC tag 103. The NFC tag 103 is able to be programmed and/or encoded with personalized digital content. For example, the NFC tag 103 is able to be encoded with a link to a personalized web address or web program which contains personalized digital content such as a video message, audio message and/or pictures. In some embodiments, the personalized web address or web program is private and unique to the NFC tag 103 and is only able to be accessed by the NFC tag 103 with the serial code and link corresponding to the web address or web program. After the NFC tag 103 is encoded, the personalized message is automatically accessed by tapping the tag body 101 with a NFC enabled device, which accesses the personalized web address or web program and begins playing the message.

In some embodiments, in order to program and/or encode the personalized content to the NFC tag 103, a NFC enabled device is used. FIG. 2 illustrates a system for automatically linking customizable and/or personalized information to an object in accordance with some embodiments. In some embodiments, an application loaded onto a NFC enabled device 210 is used to program and/or encode the NFC tag 203 with personalized digital content. In some embodiments, the NFC enabled device 210 is an electronic media device such as a smart phone or tablet. However, any appropriately equipped NFC enabled device is able to be used. In this manner, a user is able to create a personalized digital content and encode the NFC tag 203 with a link to the personalized digital content. Once the NFC tag 203 is encoded, a NFC device such as depicted in FIG. 2, is used to tap the tag body 201 in order to access the personalized digital content. As described above, when the tag body 201 is tapped, the NFC enabled device automatically accesses a personalized web address or web program through the internet 220 and begins playing the personalized message. In some embodiments, the NFC tag 203 is locked after it is encoded so that it cannot be written over. In some embodiments, the NFC tag 203 is rewritable.

FIG. 3 shows a tag body 301 and NFC tag attached to an additional object 330 in accordance with some embodiments. The NFC tag and tag body 301 are similar to the NFC tag 103 and tag body 101 as described above. Particularly, the NFC tag is blank and comprises an individual serial code unique to the NFC tag. The NFC tag is able to be programmed and/or encoded with personalized digital content such as a video message, audio message and/or pictures.

As shown in FIG. 3, the tag body 301 is attached to a greeting card. In some embodiments, the tag body 301 is attached to the greeting card by an adhesive layer or hook and loop fastener. However, the tag body 301 is able to be attached to the greeting card by any appropriate mechanism as known in the art. In these embodiments, the NFC tag is programmed and/or encoded with personalized digital content before the tag body 301 is attached to the additional object 330. Specifically, the tag body 301 is attached to the additional object 330 after the personalized digital content is created and the NFC tag is encoded with a link to the content. Then, as described above, when the tag body 301 is tapped by a NFC enabled device, the personalized content is accessed and automatically begins playing.

For example, if a user is sending a birthday card, the user is able to create a personalized happy birthday message and upload the content to a unique and/or private personal web address or web program. A NFC tag is encoded with a link to the personal web address or web program containing the happy birthday message and the tag body containing the NFC tag is attached to the birthday card. Consequently, when the birthday card is received and the tag body is tapped by a NFC enabled device, the personalized happy birthday message is accessed and automatically begins playing.

In some embodiments, the NFC tag is encoded with information about the object to which it is attached. For example, a NFC tag body is attached to an event invitation and the NFC tag is encoded with a link to personalized digital content created by the host of the event that describes the event and invites the recipient to the event. Alternatively, in some embodiments, the NFC tag body is attached to a gift basket and the NFC tag is encoded with a link to personalized digital content describing the contents of the basket. As will be apparent to someone of ordinary skill in the art, the NFC tag is able to link to any appropriate desired information. Additionally, the NFC tag and NFC tag body 301 are able to be attached to any appropriate desired object. For example, in some embodiments, the NFC tag and NFC tag body 301 are attached to a candle or other gift item. In some embodiments, the NFC tag body 301 further comprises a removable cover 305 which contains instructions on how to encode the NFC tag and access the encoded information. The removable cover 305 can be attached to the tag body 301 with an adhesive, electrostatically, or by a hook and loop fastener. As shown within FIG. 3B, the cover 305 is removed by peeling off before the NFC tag is encoded.

FIG. 4 illustrates a method of linking personalized digital content to an object, in accordance with some embodiments. As shown in FIG. 4, in the step 404, a program is used in order to create personalized digital content. In some embodiments, the personalized digital content is a video message, audio message and/or pictures. For example, in some embodiments, the personalized digital content is a happy birthday message. In the step 406, a NFC tag is encoded with a link to the personalized digital content. In some embodiments, the NFC tag comprises a serial code unique to the NFC tag and the encoded personalized digital content is only able to be accessed by the NFC tag with that unique serial code. As described above, tapping the NFC tag with a NFC enabled device accesses and begins playing the personalized digital content. In some embodiments, the NFC tag is attached to an additional object.

In use, an encodable NFC tag is programmed with personalized digital content and combined with a greeting card or other object in order to create a personalized message. To link the personalized digital content to the NFC tag, personalized digital content such as a personal message and/or a personal greeting is created. Then, a blank NFC tag with a unique serial code is encoded with the link to the personalized digital content. After the NFC tag is encoded, tapping the tag with a NFC enabled device opens the link to the personalized digital content and the content automatically begins playing on the NFC enabled device. By attaching the NFC tag to an object such as a gift or greeting card, a personalized message is able to be sent along with the object. Additionally, because the NFC tag is able to be encoded and read by the NFC enabled device, the NFC tag is easily programmed and read. In this manner, a user can quickly and easily create personalized messages, objects and gifts for family, friends and business contacts. Accordingly, the presently claimed invention as described herein has many advantages.

Although the above-discussed embodiments relate to customized, personal or sentimental messages, it is contemplated that a NFC tag is able to be programmed and/or encoded with technical or medical digital content. For example, a NFC tag is able to be encoded with a link to a web address or a web program which contains technical or medical information. Such information can include user guides, owner's manuals, instructional manuals, technical manuals, technical specifications, training guides, fact sheets, how-to videos, replacement parts list, medical data, and/or the like for or about an electronic device, an appliance, a tool, a machinery or another product. A link can be to a source location. The source location can be a data store or an online drop box residing in a private network or public cloud, or a public or private web server which, in turn, can access such a data store. Typically, the source location can be accessed from anywhere in the world. Data stored in the data store can be in any format (e.g., PDF, TXT, JPEG, MPEG) and updated such that the most up-to-date information is provided. After a NFC tag is encoded with a link, the digital content can be automatically accessed by tapping the NFC tag with a NFC enable device to be coupled with the source location associated with the link. It is contemplated that a NFC tag having enough memory is able to be programmed and/or encoded with the digital content for local access without accessing a network.

Security features can be implemented to control access to the source location. For example, one or more web pages of a website are password protected to access information contained thereon. For another example, a data store requires the correct user login information to access data stored therein. For yet another example, a web address can be private and unique to a NFC tag and can only be accessed by the NFC tag with a serial code unique to the NFC tag and a link corresponding to the web address.

Blank NFC tags can be programmed with such digital content by end users for personal use. It is contemplated that an end user is able to program a blank NFC using the system 200. For example, as illustrated in FIG. 5, a NFC tag 501a is adhered to a lawn mower 530a that had previously been programmed with a link to a personal or private data store containing a guide that had been digitalized and saved therein. If the lawn mower 530a cannot be started, for instance, the NFC tag 501a on the lawn mower 530a can be tapped with a NFC enabled device to access the guide located in the personal data store on a home network. For another example, a NFC tag 501b is adhered to a dryer 530b that had previously been programmed with a web link to the official manufacturer's website containing a replacement parts list for the dryer 530b. If the dryer lint screen breaks, for instance, the NFC tag 501b on the dryer 530b can be tapped with a NFC enabled device to access the replacement parts list located at the official manufacturer's website and, perhaps, order a new dryer lint screen therefrom. For yet another example, an NFC tag 501c is adhered to a thermostat 530c that had previously been programmed with a link to a data store in a cloud containing a user manual that had been digitalized and uploaded thereto. If the thermostat 530c is being programmed for the first time, the NFC tag 501c on the thermostat 530c can be tapped with a NFC enabled device to access the user manual. In these exemplary scenarios, digital content is directly accessed from the location of each equipment to quickly aid or guide the end user in fixing, looking up parts for, or configuring the equipment.

An end user, such as a homeowner, no longer needs to keep a drawer of a hard copy of each manual for each electronic device, appliance, tool or product the homeowner owns. By attaching a NFC tag to an object, an end user can quickly and easily create digital access to online content for a faster, more convenient and green alternative to using printed material, which can be outdated, lost or simply too cumbersome to carry around such as a 200-page manual of a DSLR camera. Although FIG. 5 illustrates a lawn mower, a dryer and a thermostat, it is contemplated that an end user can adhere NFC tags to other objects including, but not limited to, personal, work-related and household items. Such usage is advantageously useful in numerous scenarios. For example, a how-to video accessed by tapping on a NFC tag previously programmed by a homeowner and adhered to a circuit breaker can in real-time assist the homeowner reset the circuit breaker when a person more experienced is not presently available.

NFC tags can also be preprogrammed and/or encoded with technical or medical information. The NFC tags can be similarly encoded with a link to a web address or web program which contains digital content for medical devices, dental equipments, industrial hardware, computers, appliances and vehicles and the like. The NFC tags can be embedded in tag bodies, such as labels, tags, overlays, faceplates, decals, placards and the like, that typically are otherwise adhered to the equipments and/or individual parts. These tag bodies including the preprogrammed NFC tags can be adhered to equipments and/or individual parts prior to these equipments and/or individual parts reaching end users. Alternatively, the preprogrammed NFC tags can be purchased by end users and adhered to equipments and/or individual parts by them. In one or both cases, manufacturing companies no longer need to print information, such as technical manuals, or create CDs containing the same, and/or to ship the technical manuals or CDs, and thus can advantageously save expenses relating to printing and shipping.

A NFC tag potentially can remain on a product for the duration of its lifetime and can never be lost. Online digital content never becomes obsolete as the digital content can be updated and/or added such that alerts, such as product recalls, warnings or updates, can be globally accessed by anyone. For example, an end user, such as an equipment operator, can easily access any recall information when servicing an equipment by tapping on a NFC tag that is adhered to the equipment.

If a product reaches into a new foreign market, included product information in the box does not need to be changed. Instead, an electronic manual in that country's native language is simply provided at a source location on the Internet and can be accessed by tapping a NFC tag adhered to the product with a NFC enabled device. If a new parts distributor has opened its facility in Sunnyvale, Calif., a parts distributor list is updated at a source location. Manufacturing companies are therefore advantageously in control of their service, maintenance, after market and authenticity of their products.

Figure 6:
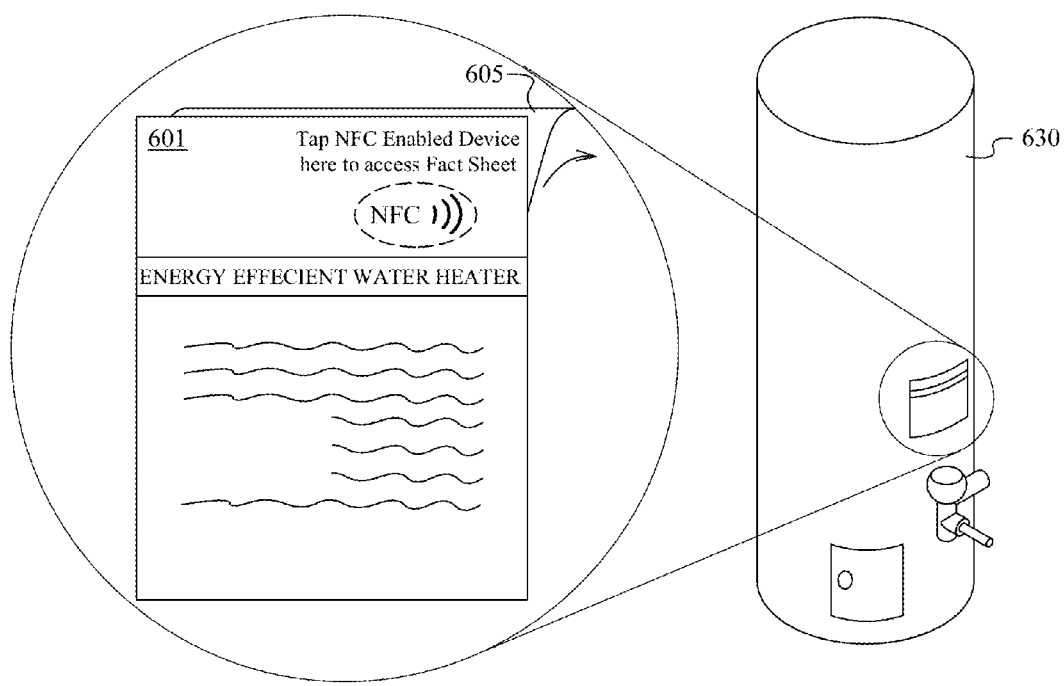
FIG. 6 illustrates exemplary apparatus for automatically linking digital content to an object attached to an object in accordance with some embodiments.

FIG. 6 illustrates a tag body 601 and NFC tag attached to an additional object 630 in accordance with some embodiments. The object 630 is an appliance. The NFC tag and tag body 601 are similar to the NFC tag 103 and tag body 101 as described above. Particularly, the NFC tag includes an individual serial code unique to the NFC tag. The NFC tag is able to be programmed and/or encoded with data such as a link to a web address or a web program which contains digital content. The NFC tag can be programmed and/or encoded with other data, including a phone number, which would enable an NFC enabled device to automatically call that phone number.

As shown in FIG. 6, the tag body 601 is attached to a water heater. In some embodiments, the tag body 601 is attached to the water heater by an adhesive layer. However, the tag body 601 is able to be attached to the water heater by any appropriate mechanism as known in the art. In these embodiments, the NFC tag is programmed and/or encoded with digital content or a link before the tag body 601 is attached to the additional object 630. Specifically, the tag body 601 is attached to the additional object 630 after the digital content is created and the NFC tag encoded with the digital content or a link to the digital content. Then, as described above, when the tag body 601 is tapped by a NFC enabled device, the digital content is accessed. The digital content is about the water heater. For example, the digital content can include a service manual in numerous languages.

In some embodiments, the NFC tag body 601 further comprises a removable cover 605, which can be attached to the tag body 601 with an adhesive or electrostatically. As shown in FIG. 6, the cover 605 is removed by peeling off for adhering the NFC tag body 601 to the water heater. The tag body 601 is shown as a label. However, a tag body can be a tag, overlay, faceplate, decal, placard or the like.

A tag body can be manufactured with one or more materials that withstand harsh environments and chemicals (e.g., UV coated, laminated), meets agency test lab requirements (e.g., UL, CSA, ETL, TUV, VDE), are tamper evident, insulates against electric shock, or a combination thereof. The materials include aluminum, papers, tamper evident, vinyls, infrared scannable, reflective, kaptons, adhesives, polyesters, polycarbonates, overlaminates, polymides, and holograms. Other materials are possible. A tag body can have a smooth or textured surface. A tag body can be of any shape but large enough to embed a NFC tag.

In some embodiments, a password or a access key is printed or otherwise included on a tag body. As discussed above, a website can be protected, granting access only when the correct password or access key is provided. As such, an end user would be able to access such a website by entering the password or access key found on the tag body.

Every time a source location is accessed by tapping a NFC tag with a NFC enabled device, a company managing or controlling the source location can perform data gathering and/or statistical analysis of user behavior, location of the device, and other characteristics pertaining to that access. A company can mark a source location with meta data, and can use the meta data and cookies enabled on a browser of a NFC enabled device in its data gathering and/or statistical analysis. Based on the gathering and analysis, a company can perhaps understand, for example, which products typically have issues or the geography of products, for product improvement, marketing and other purposes.

Figure 7:
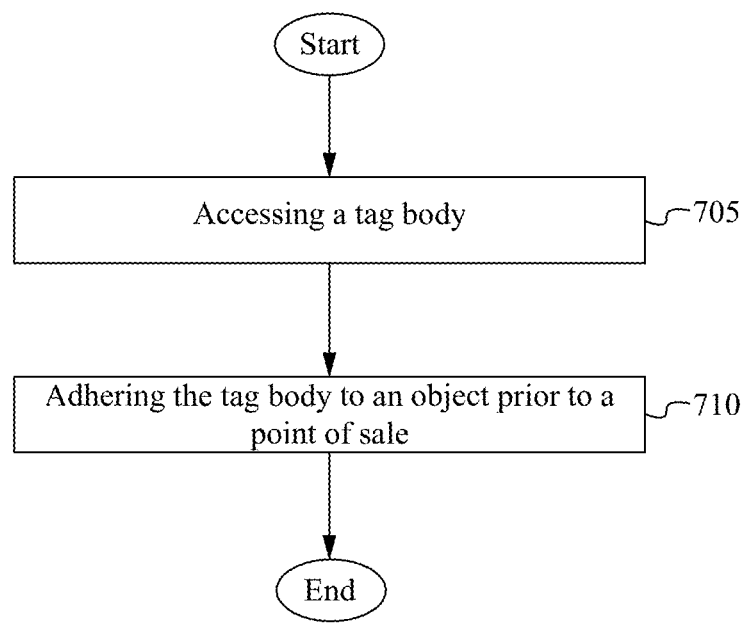
FIG. 7 illustrates exemplary method of automatically linking digital content to an object attached to an object in accordance with some embodiments.

FIG. 7 illustrates method 700 of automatically linking digital content to an object attached, in accordance with some embodiments. The method 700 starts at a step 705, where a tag body is accessed. The tag body typically includes a NFC tag encoded with a network address of a data source containing digital content of the object. Typically, the digital content is previously created and stored at the data source. However, the digital content can be updated. In some embodiments, security measures for accessing the digital content are implemented.

At a step 710, the tag body is adhered to the object. In some embodiments, the tag body is adhered to the object prior to a point of sale of the object. In some embodiments, the tag body is adhered to the object prior to the object reaching an end user. Thereafter, the digital content located at the data source is automatically accessed by tapping the NFC tag. As discussed above, the digital content can include technical information, technical manuals, training guides, how-to videos or a combination thereof. Other digital content can be included. After the step 710, the method 700 ends.

It should be understood that "tapping" as discussed throughout this disclosure means to bring a NFC enabled device in at least close proximity, such as within a few millimeters, of a tag.

As discussed above, printed materials are often out of date due to changes, revisions, part obsolescence, safety and recall. A tag of the present invention allows for a dynamic, cost effective means of attaching most current information being available globally.

NFC tags contain chips is able to store a small amount of information for transfer to an NFC enabled device. A NFC tag can be individually purchased and programmed or encoded with any data by using an NFC enabled device and a NFC encoding software installed thereon. A NFC tag can be conveniently encoded simply by holding the NFC enabled device over the NFC tag. A NFC tag can be encoded in seconds. However, such convenience can easily allow NFC tag to be intentionally or accidentally encoded. For example, a stack of blank of NFC tags sitting on a store shelf can be purposely programmed by a person without first purchasing the NFC tags. A buyer in the store could purchase one of these tags without knowing that the NFC tag is no longer blank and, perhaps, has even been locked.

A NFC tag to be individually sold can be coupled with a protector or shield at one side of the NFC tag to prevent tampering of the NFC tag in a retail environment. The protector must be removed in order for the NFC tag to be programmed or write enabled.

In some embodiments, a tampered-proof NFC tag is part of a sticker system. The sticker system includes a sticker tag and a barrier. The sticker tag typically includes a programmable NFC tag and a tag body, such as a sticker, coupled with the NFC tag. The barrier is typically removably coupled with the sticker tag using an adhesive. When the barrier remains coupled with the sticker tag, the NFC tag cannot be programmed. However, when the barrier is removed from the sticker tag, the NFC tag can be programmed. It should be noted that the terms barrier, shield and protector refer to a metallic sheet configured to prevent a NFC tag to be programmed when the metallic sheet is coupled with the NFC tag, and that the terms are used interchangeably within the disclosure.

The barrier is typically a foil sheet. The foil sheet can be silver or any color. The size of the barrier can be the same as the size of the sticker. In some embodiments, the size of the barrier is at least the size of the NFC tag. Alternatively, the size of the barrier is smaller than the size of the NFC tag but covers at least a portion of the NFC tag.

Figure 8A:
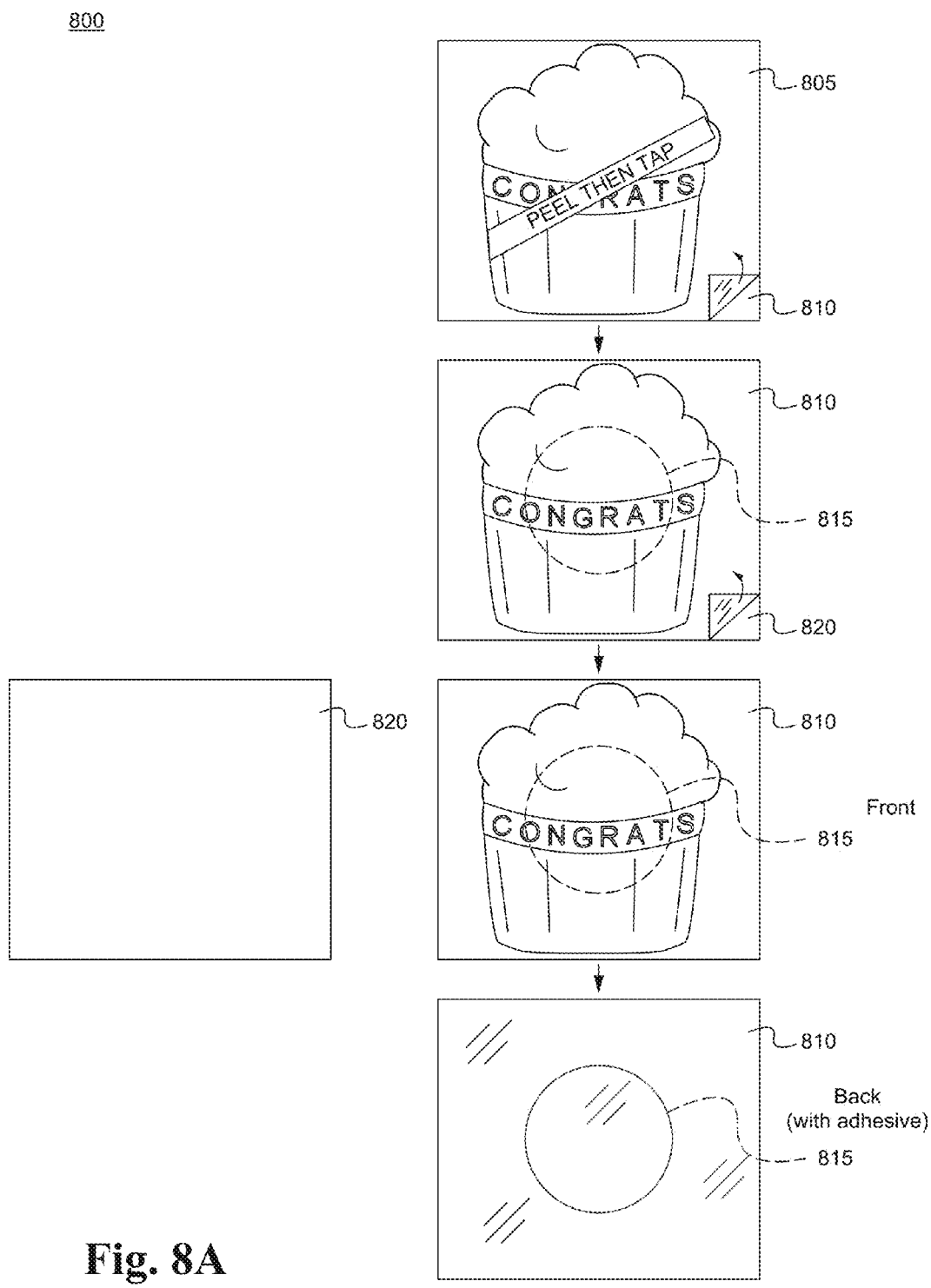
FIGS. 8A-8B illustrate an exemplary sticker system in accordance with some embodiments.

FIG. 8A illustrates an exemplary sticker system 800 in accordance with some embodiments. The sticker system 800 includes a barrier 805, a sticker tag, and a carrier 820. The sticker tag includes a sticker 810 and a NFC tag 815. The sticker 810 is typically coupled with the NFC tag 815 on one side of the sticker 810 and is removably coupled with the barrier 805 on another side of the sticker 810 via an adhesive. The sticker 810 is positioned between the barrier 805 and the NFC tag 815. In some embodiments, the barrier 805 includes a printed image on a surface of the barrier 805. For example, the printed image can include instructions to use the sticker system 800. In some embodiments, the sticker 810 includes a printed image on a surface of sticker 810 facing the barrier 805. As shown in FIG. 8A, the printed image on the barrier 805 is the same as the image on the sticker 810 and includes the instruction: PEEL THEN TAP.

Figure 8B:
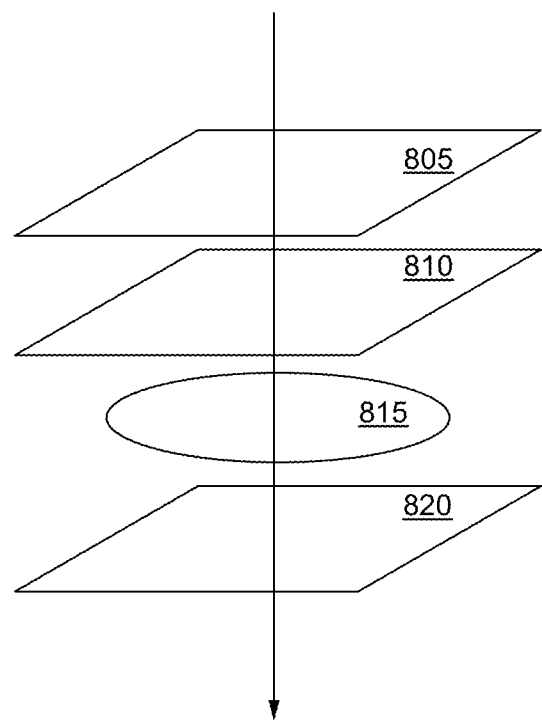

FIG. 8B illustrates a plurality of layers in the sticker system 800. As illustrated, the first layer is the barrier 805, the second layer is the sticker 810, the third layer is the NFC tag 815, and the fourth layer is the carrier 820. The sticker system 800 includes a two-step peeling process of encoding and adhering. The barrier 805 is peeled off of the sticker tag in order to encode the NFC tag 815. The carrier 820 is peeled off of the sticker tag in order to adhere the sticker tag to an object, such as a gift item that could be included as part of the sticker system 800.

Figure 8C:
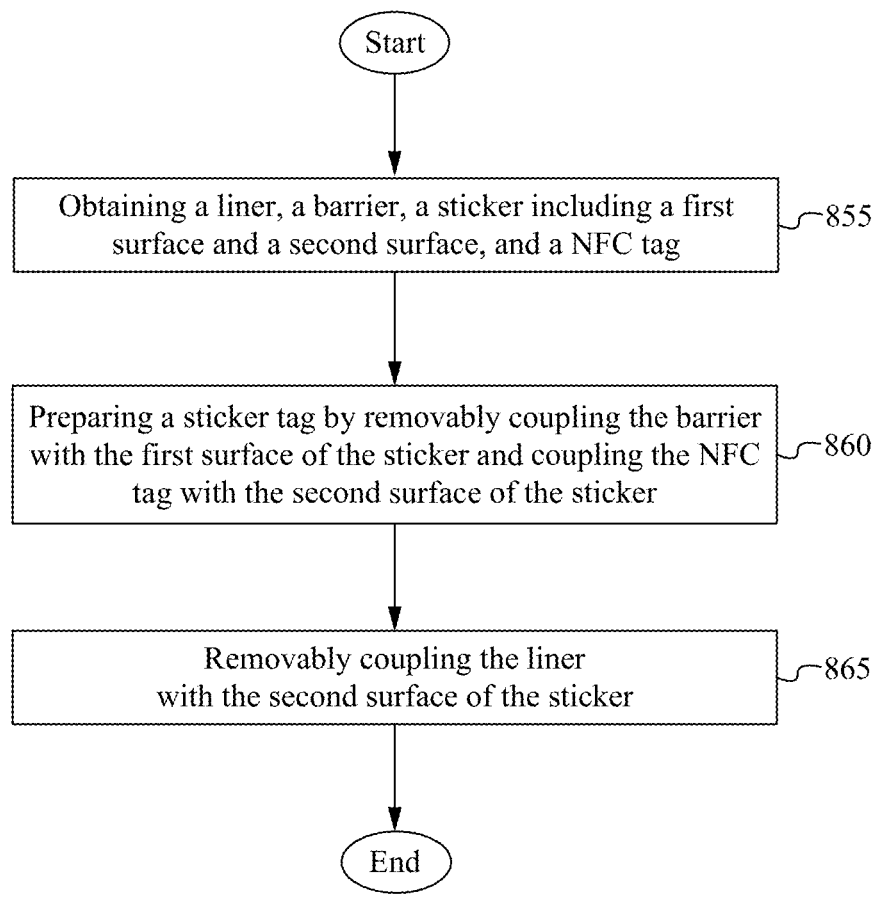
FIG. 8C illustrates a method of forming the sticker system illustrated in FIGS. 8A-8B in accordance with some embodiments.

FIG. 8C illustrates a method 850 of forming the sticker system 800. The method 850 begins at a step 855. A carrier, a barrier, a sticker, and a NFC tag are obtained. The sticker typically includes a first surface and a second surface. At a step 860, a sticker tag is prepared. Preparing the sticker tag includes removably coupling the barrier with the first surface of the sticker, and coupling the NFC tag with the second surface of the sticker. At a step 865, the carrier is removably coupled with the second surface of the sticker. After the step 865, the method 800 ends.

The sticker system 800 includes the following properties: (1) when the barrier remains coupled with the first surface of the sticker, the NFC tag is write protected, (2) when the barrier is removed from the first surface of the sticker, the NFC tag is no longer write protected, and (3) when the sticker tag is removed from the carrier, the sticker tag is configured to adhere with an object.

Figure 9A:
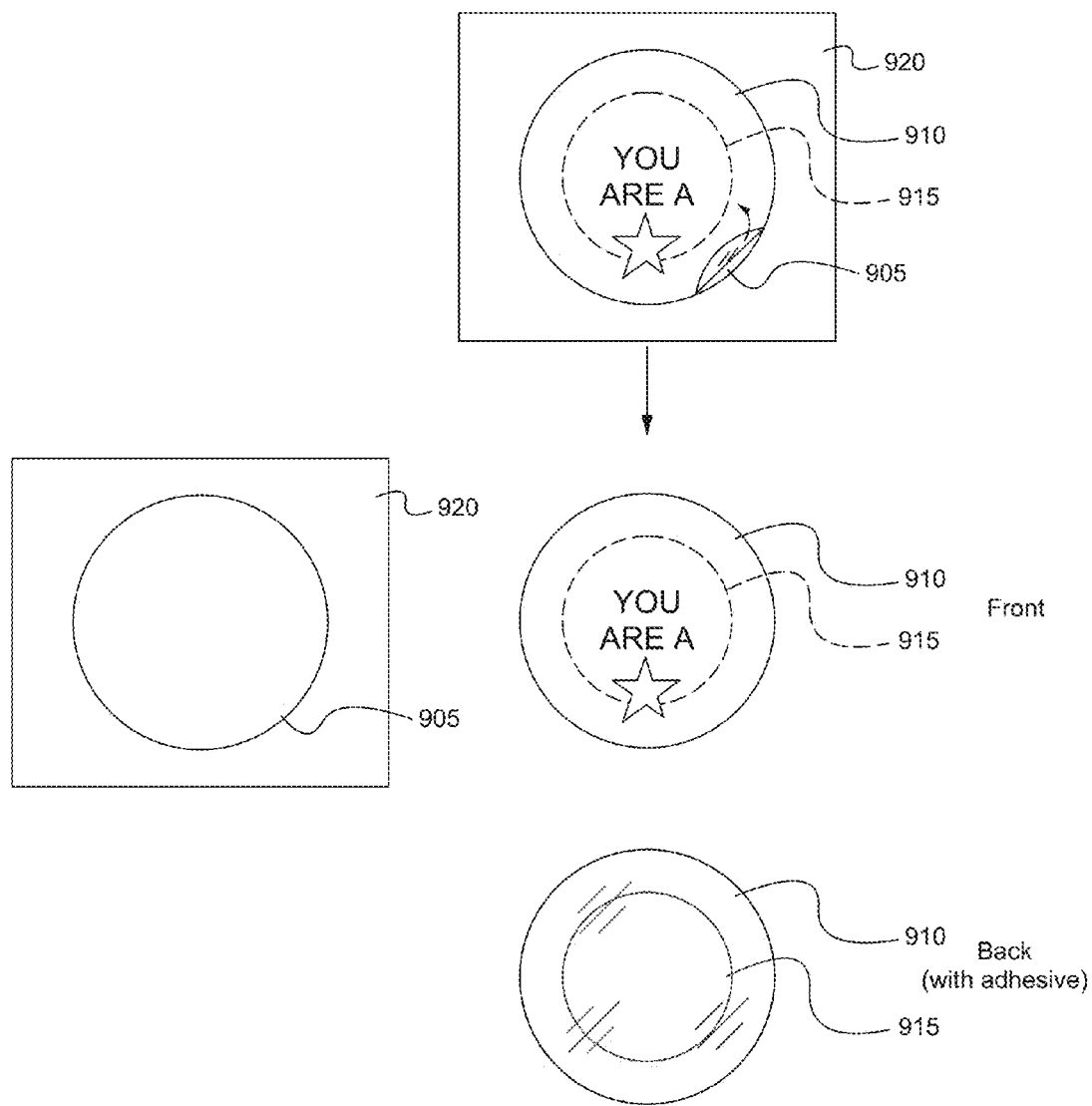
FIGS. 9A-9B illustrate another exemplary sticker system in accordance with some embodiments.

FIG. 9A illustrates another exemplary sticker system 900 in accordance with some embodiments. The sticker system 900 includes a barrier 905, a sticker tag, and a carrier 920. The sticker tag includes a sticker 910 and a NFC tag 915. The NFC tag 915 is typically coupled with the sticker 910 on one side of the NFC tag 915 and is removably coupled with the barrier 905 on another side of the NFC tag 915. The NFC tag 915 is positioned between the sticker 910 and the barrier 905. In some embodiments, the barrier 905 includes a liner. In some embodiments, the sticker 910 includes a printed image on a surface of the sticker 910.

Figure 9B:
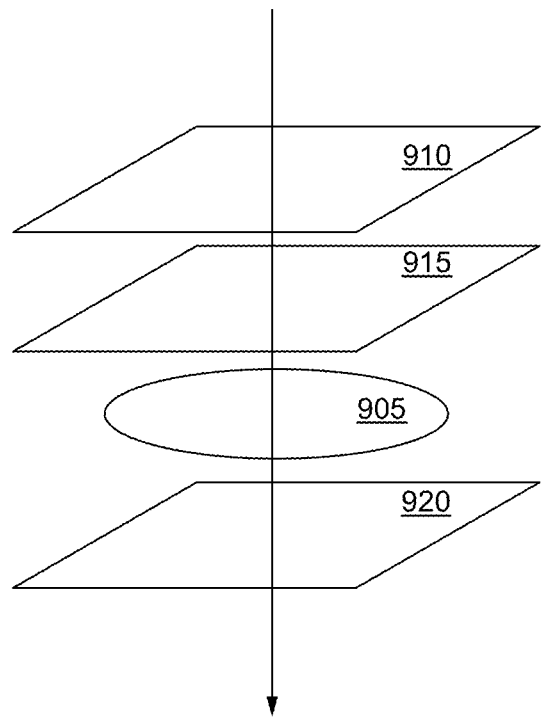

FIG. 9B illustrates a plurality of layers in the sticker system 900. As illustrated, the first layer is the sticker 910, the second layer is the NFC tag 915, the third layer is the barrier 905, and the fourth layer is the carrier 920. In some embodiments, the barrier 905 is removably coupled with the carrier 920. The sticker system 900 includes a one-step peeling process of encoding and adhering. The sticker tag is peeled off the barrier 905 (and the carrier 920 as well) in order to encode the NFC tag 915 and to adhere the sticker tag to an object, such as a gift item that could be included as part of the sticker system 900.

Figure 9C:
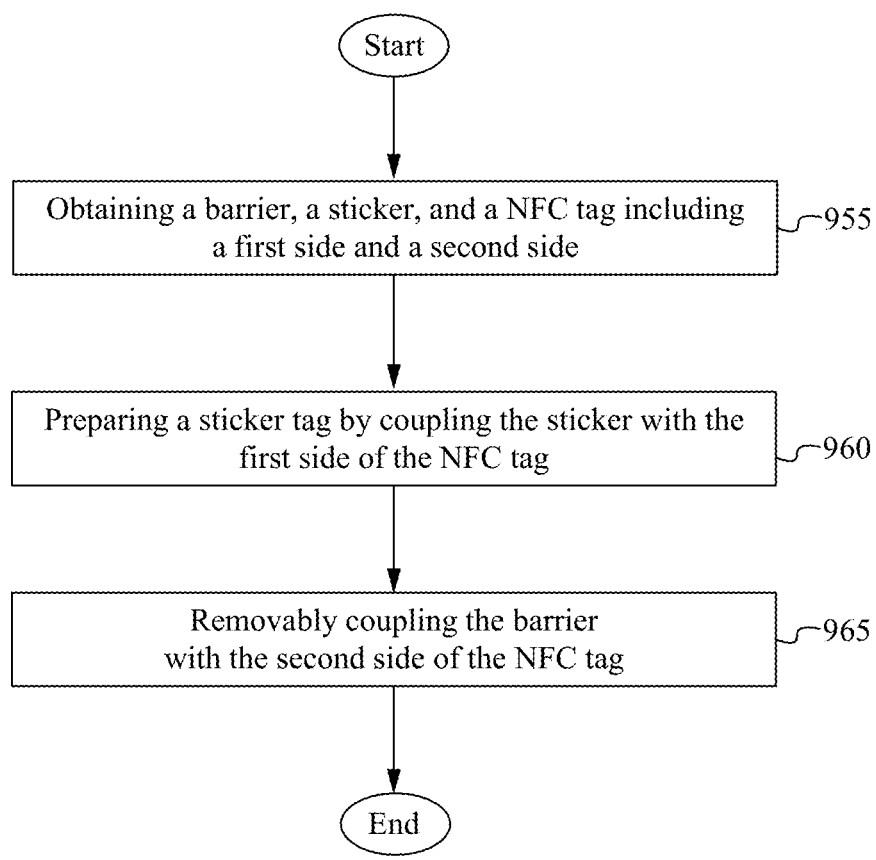
FIG. 9C illustrates a method of forming the sticker system illustrated in FIGS. 9A-9B in accordance with some embodiments.

FIG. 9C illustrates a method 950 of forming the sticker system 900. The method 950 begins at a step 955. A barrier, a sticker and a NFC tag are obtained. The NFC tag typically includes a first side and a second side. At a step 960, a sticker tag is prepared. Preparing the sticker tag includes coupling the sticker with the first side of the NFC tag. At a step 965, the barrier is removably coupled with the second side of the NFC tag. After the step 860, the method 800 ends.

The sticker system 900 includes the following properties: (1) when the barrier remains coupled with the NFC tag, the NFC tag is write protected, and (2) when the barrier is removed from the NFC tag, the NFC tag is no longer write protected and the sticker tag is configured to adhere with an object.

Embodiments of the sticker system of the present invention provide a simple solution of preventing tampering of a NFC tag that is individually sold in a retail environment. As discussed above, as long as a barrier is coupled with a NFC tag, the NFC tag cannot be programmed or encoded. The barrier could be coupled above or behind the NFC tag, and the NFC tag remains write protected. The barrier acts as a protector for the NFC tag. Upon removing a barrier from a sticker tag, a NFC tag of the sticker system can be programmed. The sticker tag includes an adhesive that allows the sticker tag to be coupled with an object. For example, the object can be a personal item or a gift item, such as a greeting card or a gift basket. For another example, the object can be a business card or resume.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method comprising:
obtaining a sticker system that includes:
   an externally visible sticker tag that includes:
      a programmable NFC tag; and
      a sticker coupled with the NFC tag;
   a barrier removably coupled with the sticker tag using an adhesive, wherein when the barrier remains coupled with the sticker tag, the NFC tag cannot be programmed, and wherein when the barrier is removed from the sticker tag, the NFC tag can be programmed; and
   a peelable carrier;
removing the barrier from the sticker system;
encoding the NFC tag with a network address of a remote data source containing digital content;
removing the peelable carrier from the sticker system;
adhering the sticker tag to an object, wherein the digital content located at the remote data source is accessible by tapping the NFC tag using an NFC-enabled device; and
providing the NFC-enabled device with the digital content from the remote data source.

2. The method of claim 1, wherein the NFC tag is coupled with the sticker on one side of the NFC tag and is removably coupled with the barrier on another side of the NFC tag.

3. The method of claim 1, wherein the NFC tag is positioned between the sticker and the barrier.

4. The method of claim 1, wherein the barrier is a foil sheet.

5. The method of claim 4, wherein the foil sheet is silver.

6. The method of claim 1, wherein a size of the barrier is the same as a size of the sticker.

7. The method of claim 1, wherein a size of the barrier is at least a size of the NFC tag.

8. The method of claim 1, wherein the barrier is removably coupled with the peelable carrier.

9. The method of claim 1, wherein the sticker tag is removably coupled with the peelable carrier.

* * * * *